United States Patent [19]

Lincoln

[11] 4,152,868

[45] May 8, 1979

[54] METHOD OF PRODUCING MUSHROOM SPAWN

[76] Inventor: Richard G. Lincoln, 6820 Kallin Way, Long Beach, Calif. 90815

[21] Appl. No.: 880,770

[22] Filed: Feb. 24, 1978

[51] Int. Cl.² .............................................. A01G 1/04
[52] U.S. Cl. .......................................... 47/1.1; 47/58
[58] Field of Search ..................................... 47/1.1, 58

[56] References Cited

U.S. PATENT DOCUMENTS 3,865,695   2/1975   Massier ................................ 47/1.1 X

FOREIGN PATENT DOCUMENTS 2151326  7/1973  Fed. Rep. of Germany ............. 47/1.1
4720390  6/1972  Japan ......................................... 47/1.1

Primary Examiner—Robert E. Bagwill
Attorney, Agent, or Firm—William C. Babcock

[57] ABSTRACT

An improved method of producing mushroom spawn without the necessity of employing a heated pressurized autoclave to sterilize the growth chamber and the mushroom mycelium growth medium contained therein. The elimination of the autoclave not only eliminates an expensive piece of equipment, but also saves substantial time, as well as the possibility of serious injuries that have occurred in the past in using heated autoclaves.

3 Claims, 2 Drawing Figures

METHOD OF PRODUCING MUSHROOM SPAWN

BACKGROUND OF THE INVENTION

1. Field of the Invention

Improved Method of Producing Mushroom Spawn.

2. Description of the Prior Art

In the past, the nutrient for the growth of mushroom spawn has normally been a grain base. The prior art method of producing the mushroom spawn involves the cooking of the grain in water, with the grain then being loaded into growth chambers, which chambers are normally glass jars with lids having openings therein that contain filters, with the filters allowing the escape of gases from the growth chambers, but preventing the entry of micro organisms into the chambers.

The growth chambers and contents are then placed in a steam autoclave and subjected to heat and pressure to the extent that all microbiological organisms that would grow in the nutrient at ambient temperature are inactivated. The growth chambers are cooled to ambient temperature and inoculated with mushroom mycelium of a desired species and strain. The inoculated growth chambers are then maintained at a temperature and under such environmental conditions that are most favorable for the growth of the mushroom mycelium. The spawn is completed when the grain has been thoroughly occupied or grown through by the mycelium.

The prior art method above-described has the operational disadvantage that the autoclave is an extremely expensive piece of equipment, and limits the production of mushroom spawn, for only a limited number of the growth chambers can be disposed in the autoclave at the same time. The growth chambers are in the autoclave from three to four hours. The autoclave due to being pressurized is a hazardous piece of equipment, and in addition to the expense and time involved in using the same may result in serious injuries to inexperienced personnel if it is opened prior to the pressure within the autoclave being equalized with the pressure of the ambient atmosphere.

A major object of the present invention is to provide a method of producing mushroom spawn that eliminates certain operational disadvantages of the prior art methods, namely, the use of any type of heated or pressurized autoclave, the excessive time required in using the autoclave, the hazard of using the autoclave, and the requirement of substantial capital to go into the business of growing mushroom spawn.

SUMMARY OF THE INVENTION

In the practice of the present invention, grain is sequentially subjected to a fumigant to sterilize the same, with the sterilized grain then being transported into the confines of a clean room where it is combined with a quantity of sterile water. The mixture of sterile grain in water is then subjected to heat to cook the grain.

A number of sterile growth chambers are provided that are of conventional design, and of the type that includes a wide mouth jar having a top removably securable thereto, with the top having an opening therein that contains a filter. A jar of this structure allows gas to escape from the interior through the opening and filter and air to enter the jar from the ambient atmosphere but prevents micro organisms migrating into the interior of the jar through the filter. Growth chambers of the above-described type are sequentially sterilized and brought into the cleaning room to be loaded with cooked grain, after the covers have been removed from the growth chambers. Each of the growth chambers containing the cooked grain which acts as a nutrient, is inoculated with mushroom mycelium of a desired species, with the cover then being replaced on the growth chamber. The growth chambers may then be transported to a desired location outside the clean room that is maintained at a temperature and under such environmental conditions as to encourage the optimum growth of the mushroom mycelium. The growth of the spawn is completed in the growth chamber when the mycelium has grown through the nutrient contained therein and occupies a substantial portion thereof.

DESCRIPTION OF THE PREFERRED EMBODIMENT

Figure 1:
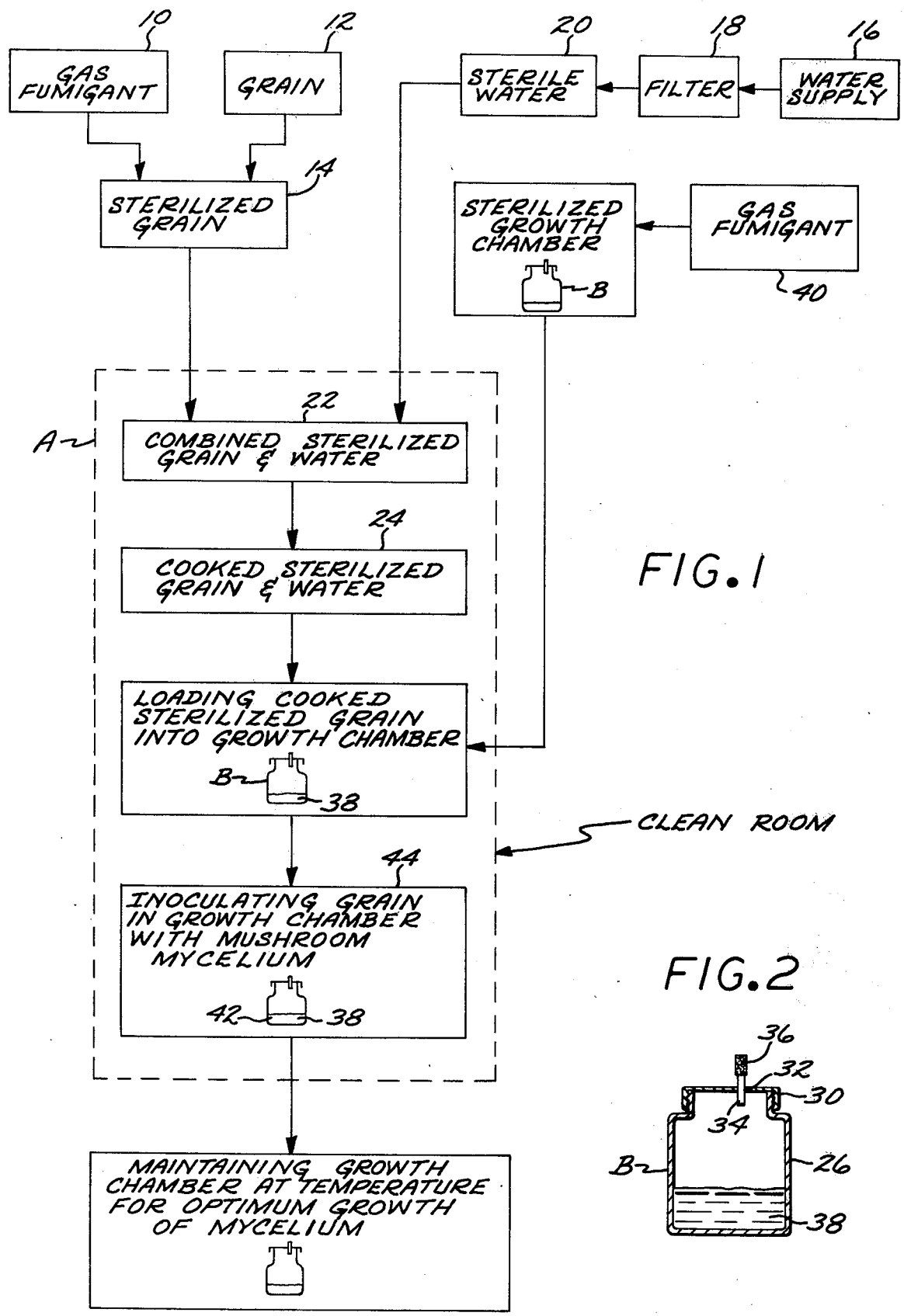
FIG. 1 is a diagram illustrating the steps that occur in the practice of the present invention.
Figure 2:
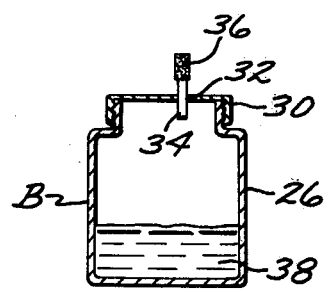
FIG. 2 is a side elevational view of a conventional growth chamber.

In practicing the method of the present invention a quantity of a gas fumigant such as ethylene oxide, propylene oxide, methylene bromide, formaldehyde, or other gaseous fumigants is provided that is used to sequentially subject grain 12 to a sterilizing action, and the action when completed providing a quantity of the sterilized grain 14 as shown on FIG. 1. The sterilized grain is transported under sterile conditions to the confines of a clean room A that is free of micro organisms, and the grain then being combined with sterilized water. The sterilized water 20 results from domestic water 16 or other suitable source of water being subjected to a micropore filter operation or reverse osmosis, to provide the sterile water 20 that is combined with the sterilized grain 14. After the mixture of sterilized water and grain 22 has been effected it is subjected to heat within the confines of the clean room A to provide a sterilized cooked grain 24. A number of growth chambers B, such as shown in FIG. 2 are provided with each growth chamber including a wide mouthed bottle 26 that has a neck 28 that may be removably engaged by a cover 30 that seals therewith. The cover has an opening 32 therein through which a tube 34 extends upwardly to terminate in a filter 36. The tube 34 is in communication with the interior of the bottle 26 and permits gas products to escape from the bottle to the ambient air through the filter 36 but prevents micro organisms in the ambient atmosphere entering the interior of the bottle 26. The bottle 26 in the lower portion thereof contains a nutrient 38. The growth chambers B after being subjected to a fumigant 40 are in a sterile condition and are transported as such into the interior of the clean room A and are then partially loaded with the nutrient 38, which nutrient is the cooked grain previously described. Each of the growth chambers after being so loaded is inoculated with mushroom mycelium 42 as shown in square 44 of the diagram in FIG. 1. The cover 30 on each growth chambers B after such inoculation takes place. The growth chambers B with the covers 30 in sealing engagement with the neck 28 thereof are now transported from the clean room A to an environment and temperature at which optimum growth of the mushroom mycelium takes place, with this growth being completed when the spawn have grown through the body of nutrients 38 and substantially occupy the same. The growth chambers B may conveniently provided by conventional mason jars having a threaded neck 28 that is engaged by an internally threaded cover 30 and suitable ring-shaped resilient sealing means.

Applicant's method has previously been described in detail and need not be repeated.

What is claimed is:

1. An improved method of growing mushroom spawn in a plurality of growth chambers, with each of said chambers having a removable cover that is vented to the ambient atmosphere through a filter, said method including the steps of:
   a. providing a clean enclosure substantially free of micro organisms;
   b. providing a source of a gaseous fumigant;
   c. subjecting a quantity of a mushroom mycelium growth nutrient to said fumigant to sterilize said nutrient;
   d. providing a quantity of sterile water in said clean enclosure;
   e. transporting said sterile nutrient to said clean enclosure and mixing the same with a quantity of sterile water;
   f. heating the mixture of sterile water and sterile nutrient in said clean room to cook the nutrient;
   g. sequentially sterilizing said growth chambers and covers and disposing said growth chambers and covers in said clean room;
   h. partially filling said growth chambers in said clean room with said heated nutrient after the latter has cooled to ambient temperature;
   i. inoculating said nutrient in said clean room in said growth chambers with mushroom mycelium of a desired species;
   j. placing said covers in sealed positions on said growth chambers after said inoculation;
   k. transporting said growth chambers with covers thereon to an area that is maintained at a temperature and environmental condition favorable to optimum growth of said mycelium, with said vented openings allowing escape of gases from said growth chambers, but said filters preventing the entry of micro organisms from the ambient atmosphere into the interior of said growth chambers; and
   l. allowing said mycelium to grow in said nutrient in said growth chambers until the spawn has grown through said nutrient and occupies a substantial part thereof.

2. An improved method of growing mushroom spawn as defined in claim 1 in which said nutrient is grain.

3. The method as defined in claim 1 in which the sterilizing of said growth chambers is by a gaseous fumigant.

* * * * *